Patented Mar. 25, 1947

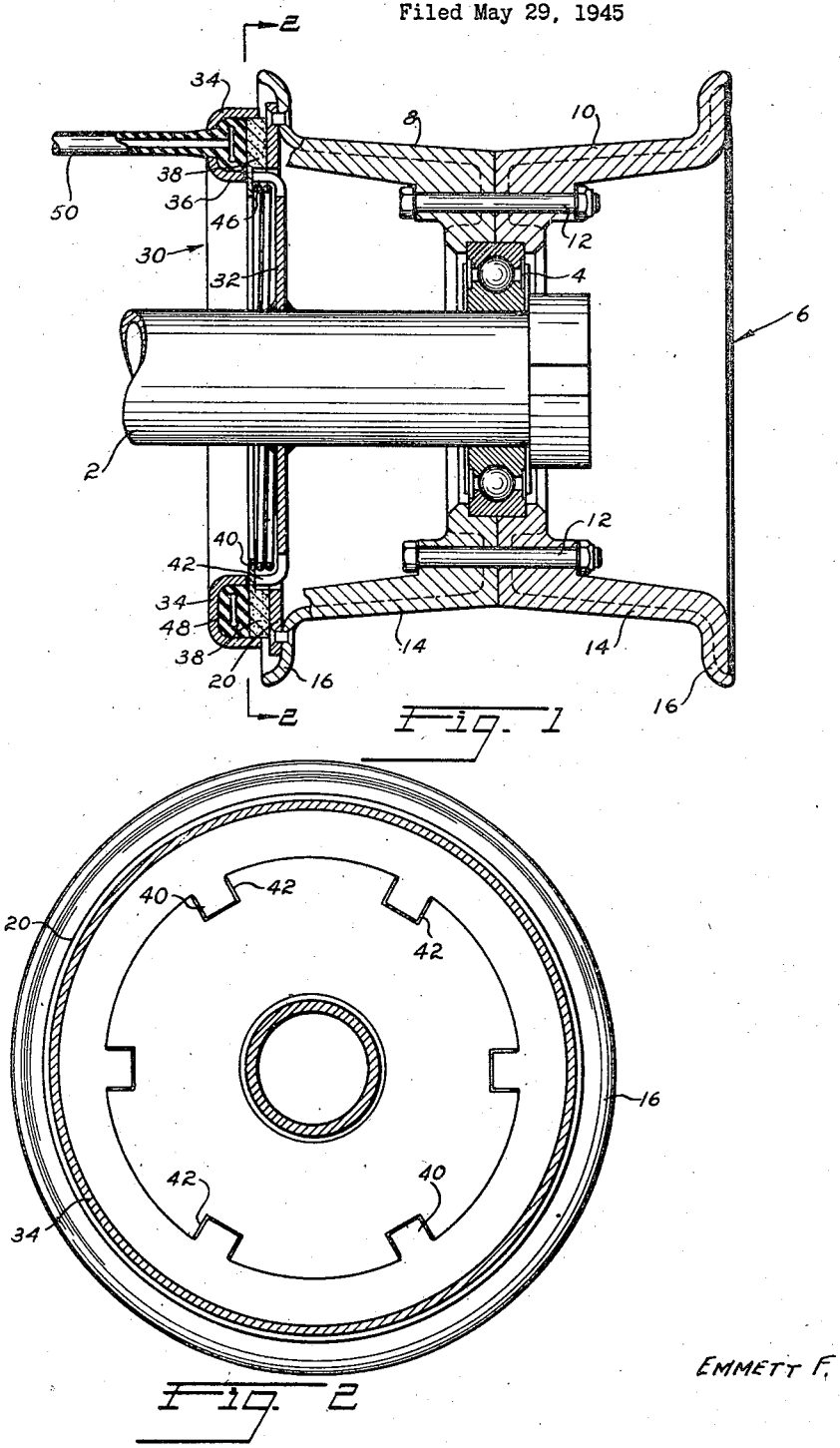

2,417,863

UNITED STATES PATENT OFFICE 2,417,863

DISC BRAKE

Emmett F. Deady, Arlington, Va., assignor to Engineering and Research Corporation, Riverdale, Md., a corporation of Maryland Application May 29, 1945, Serial No. 596,544

4 Claims. (Cl. 188—71)

This invention relates to brakes and, more particularly, to disc brakes. Such braking devices comprise a disc connected to the wheel and rotatable therewith, a non-rotatable disc positioned adjacent and parallel to the wheel-connected disc, and some means, which may be hydraulic or mechanical in operation, for moving the discs into braking engagement with each other. In a specific type of such braking devices the wheel-connected braking disc is mounted rigidly on the wheel and the non-rotatable disc is moved into engagement therewith in order to effect the braking action.

My invention relates to brakes of this described type and it is, and has been, the principal object of the invention to provide a braking device of this type which is of new, improved simplified structure and operation, utilizing a minimum number of parts which are simple and inexpensive in construction and which may be easily and quickly assembled and dis-assembled.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a cross-sectional view through an airplane wheel and brake assembly including the new and improved braking means provided by the invention, and Fig. 2 is a sectional view taken on line 2—2 of Fig. 1.

The improved wheel and brake assembly embodying my invention and disclosed in the drawings comprises a fixed axle 2 on which, adjacent the outer end thereof, is keyed the inner race of a bearing 4 having a single row of balls. The outer race of the bearing is attached centrally of the web of a wheel 6 which is formed in two substantially identical cylindrical parts 8, 10, the abutting faces of which are co-planar with the centers of the balls of bearing 4. The two halves of the wheel are connected by an annular series of bolts 12 which extend through the web of the wheel. Each of the two parts of the wheel is provided with a generally cylindrical tire-receiving rim 14 having an axially-disposed tire-retaining flange 16.

Means are provided by the invention for stopping rotation of the wheel and such means comprise an annular disc 20 which is rigidly attached, as by rivets, to the outer face of one of the tire-retaining flanges 16. A device for supporting the brake actuator and a fixed friction disc is also provided by the invention and comprises a sheet metal member denoted generally by numeral 30 and having a flat disc-like central part 32 which surrounds and is rigidly attached to axle 2 and extends axially thereof, and an outer part 34 of C-shaped cross-section which is integrally connected to the central part by an axially-extending part 36. The C-shaped part 34 is at approximately the same radial position as the wheel-carried flange 20, has approximately the same radial extent and the open side of such C-shaped part faces the flange 20 and is spaced axially outwardly therefrom. A disc 38, formed of friction material, is positioned over the open face of the C-shaped part and is mounted thereon by means of an annular series of fingers 40 which extend radially inwardly from the inner peripheral edge of the disc 38 and extend respectively through an annular series of apertures 42 in the axially-extending part 38 of the supporting device 30. Each of these apertures is extended for a short distance through the disc-like part 32 of the supporting member 30 at that portion thereof adjacent to the part 36, in order to permit the fingers 40 of the disc 38 to be moved into the apertures 42 when the parts are assembled. The apertures 42 are also made of such axial extent that the disc 38 will be permitted sufficient axial movement to move into and out of braking engagement with the wheel-supported disc 20. A spring 46, which in the form shown in the drawings is a helical compression spring, is disposed between the fingers 40 and the radially-outermost part of the part 32 of the supporting device 30 and is operable to constantly urge the disc 38 in such a direction that the friction facing thereon is normally maintained out of contact with the wheel-carried disc 20. An annular expansible, hollow tube 48 is disposed within the C-shaped part 34 of the supporting device 30 and is connected through conduit 50 to a source of fluid pressure. The tube abuts the outer face of disc 38 whereby the same is moved axially toward the wheel-carried disc 20 upon expansion of the tube.

In the operation of the described braking device, the spring 46 normally maintains the disc 38 in its inoperative position in which the friction face thereof is out of contact with the wheel-carried disc 20. If it is desired to stop rotation of the wheel fluid under pressure is introduced into tube 48 through conduit 50, thereby causing the tube to expand and force disc 38 toward and into engagement with the wheel-carried disc 20 against the force of spring 46, thereby retarding or stopping the rotation of the wheel.

I have thus provided a disc braking device having a minimum number of parts which are of simple and cheap construction and which may be easily and quickly assembled and dis-assembled. While I have described and illustrated only one embodiment of my invention it will be apparent to those skilled in the art that other embodiments, as well as modifications of that disclosed, may be made without departing in any way from the spirit or scope of the invention, for the limits of which reference must be had to the appended claims.

What is claimed is:

1. A disc brake for a wheel assembly comprising an axle and a wheel journaled thereon and having a tire-receiving rim and a tire-retaining flange, comprising an annular brake disc rigidly attached to said tire-retaining flange and having its axially inner face in face-to-face engagement with an annular radial outer face of the tire-retaining flange and its axially outer face providing a braking surface, a unitary annular brake-member supporting member surrounding the axle and comprising a radially outer part of C-shaped cross-section having its open face adjacent and spaced axially outwardly from the outer face of said brake disc and a radially inner part connecting the C-shaped part to the axle, a second annular disc substantially closing the open face of said C-shaped part and having an annular face disposed adjacent and normally spaced from the outer face of the wheel-carried brake disc, means interengagingly connecting the second disc to the lower axially-extending annular part of the C-shaped part of the supporting member for preventing rotation of said second disc while permitting axial movement thereof, means normally urging said second disc axially away from and out of engagement with the wheel-carried disc, and means disposed within said C-shaped part for forcing said second disc axially into braking engagement with the wheel-carried disc.

2. A disc brake for a wheel assembly comprising an axle and a wheel journaled thereon and having a tire-receiving rim and a tire-retaining flange, comprising an annular brake disc rigidly attached to said tire-retaining flange and having its inner face in face-to-face engagement with an annular radial outer face of the tire-retaining flange and its outer face providing a braking surface, a unitary annular brake-member supporting member surrounding the axle and comprising a radially outer part of C-shaped cross-section having its open face adjacent and spaced axially outwardly from the outer face of said brake disc and a radially inner part connecting the C-shaped part to the axle, a second annular disc substantially closing the open face of said C-shaped part and having an annular face disposed adjacent and normally spaced from the outer face of the wheel-carried brake disc, the lower axially-extending annular part of the C-shaped part having a plurality of spaced axially-elongated openings formed therein, a plurality of spaced fingers extending radially inwardly from the inner peripheral edge of said second disc each of which is received within one of said openings for axial movement therein but is held from circumferential movement therein by the walls of said opening to thereby prevent rotation of said second disc while permitting axial movement thereof, means normally urging said second disc axially away from and out of engagement with the wheel-carried disc, and means disposed within said C-shaped part for forcing said second disc axially into braking engagement with the wheel-carried disc.

3. A disc brake for a wheel assembly comprising an axle and a wheel journaled thereon and having a tire-receiving rim and a tire-retaining flange, comprising an annular brake disc rigidly attached to said tire-retaining flange and having its inner face in face-to-face engagement with an annular radial outer face of the tire-retaining flange and its outer face providing a braking surface, a unitary annular brake-member supporting member surrounding the axle and comprising a radially outer part of C-shaped cross-section having its open face adjacent and spaced axially outwardly from the outer face of said brake disc and a radially inner part connecting the C-shaped part to the axle, a second annular disc substantially closing the open face of said C-shaped part and having an annular face disposed adjacent and normally spaced from the outer face of the wheel-carried brake disc, the lower axially-extending annular part of the C-shaped part and the radially inner part of the supporting member having a plurality of spaced axially-elongated openings formed therein, a plurality of spaced fingers extending radially inwardly from the inner peripheral edge of said second disc each of which is received within one of said openings for axial movement therein but is held from circumferential movement therein by the walls of said opening to thereby prevent rotation of said second disc while permitting axial movement thereof, means normally urging said second disc axially away from and out of engagement with the wheel-carried disc, and means disposed within said C-shaped part for forcing said second disc axially into braking engagement with the wheel-carried disc.

4. A disc brake for a wheel assembly comprising an axle, and a wheel journaled thereon and having a tire-receiving rim and tire-retaining flange, comprising a brake disc rigidly fixed to the outer face of said flange, an annular sheet metal supporting device surrounding the axle comprising a radially-outermost part having a C-shaped cross-section and having its open face adjacent and spaced axially-outwardly from said brake disc, a radially extending part surrounding and attached to the axle, and an axially-extending part therebetween, having an annular series of openings therein, a second disc adjacent the open face of said C-shaped part and having an annular series of fingers extending radially inwardly from the inner peripheral edge thereof and respectively received in the openings in the axially-extending part of said supporting device, a spring between the radially extending part of said supporting device and said fingers for urging said second disc in a direction away from said wheel-carried disc and means disposed within the C-shaped part of said supporting device for forcing said second disc into braking engagement with the wheel-carried disc.

EMMETT F. DEADY.

REFERENCES CITED

The following references are of record in the file of this patent:

UNITED STATES PATENTS

| Number | Name | Date |
|---|---|---|
| 2,359,516 | Frank | Oct. 3, 1944 |